J. A. GUFFEE.
COMBINED POINT AND BOLT FOR BELTS.
APPLICATION FILED MAR. 26, 1914.

1,115,307.  Patented Oct. 27, 1914.

WITNESSES:
Robt R Ketchel
E. E. Wall

INVENTOR
John A. Guffee
BY Frank S. Busser
ATTORNEY.

UNITED STATES PATENT OFFICE.

JOHN A. GUFFEE, OF FORT WORTH, TEXAS, ASSIGNOR TO MAIN BELTING COMPANY, OF PHILADELPHIA, PENNSYLVANIA, A CORPORATION OF PENNSYLVANIA.

COMBINED POINT AND BOLT FOR BELTS.

1,115,307. Specification of Letters Patent. Patented Oct. 27, 1914.

Application filed March 26, 1914. Serial No. 827,290.

*To all whom it may concern:*

Be it known that I, JOHN A. GUFFEE, a citizen of the United States, residing at Fort Worth, county of Tarrant, and State of Texas, have invented a new and useful Improvement in Combined Points and Bolts for Belts, of which the following is a full, clear, and exact description, reference being had to the accompanying drawings, which form a part of this specification.

The object of my invention is to provide means for securing bolts to elevator belts, which will permit of a more expeditious attachment and a more secure and rigid connection and which will avoid damage to the belt.

In securing buckets to elevator belts, the usual procedure is to perforate the belt with a punch, thereby providing orifices through which are inserted headed bolts, by means of which the buckets are secured in position on the belt. The operation is comparatively slow, as the hole must first be punched, the punch withdrawn, and then the bolt inserted. In the punching operation, the fiber of the belt is more or less torn, and after the belt, with the buckets attached, has been in use for some time, the bolts become loose and rock in their orifices and the buckets consequently become loosely and insecurely attached.

The more specific object of my invention is to provide means whereby a bolt may be applied to a belt in a single operation without injury to the belt and with such rigidity that, after the buckets are attached, the bolts will not work loose in the operation of the belt.

A preferred embodiment of my invention is shown in the accompanying drawings, in which—

Figure 1:
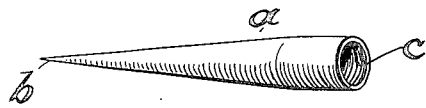
Figure 2:
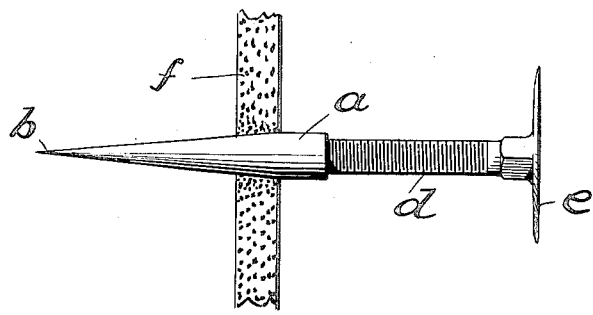
Figure 3:
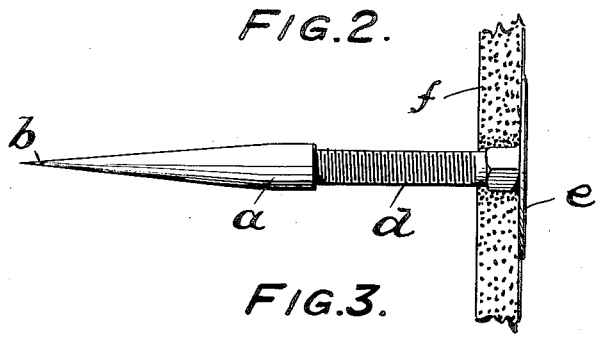
Figure 4:
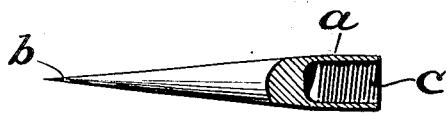

Figure 1 is a perspective view of my improved elevator bolt point; Figs. 2 and 3 are elevational views showing the manner in which the point is practically used; Fig. 4 is a detail view partly in section.

The point $a$, which is preferably made of steel, is of cylindrical shape at one end portion and of conical shape throughout the remainder of its length, being tapered very gradually to a sharp point $b$. The pointed conical end portion of the point is solid, while the opposite end portion is hollow, the wall being comparatively thin and provided with an interior screw thread $c$ for the reception of a bolt $d$ having a head $e$.

The point is operated in the following manner. The bolt $d$ is threaded in the hollow end of the point $a$, and the pointed end is applied to the belt $f$ at the place where a bolt is to be inserted. The point is then driven through the belt by giving the head of the bolt a sharp hammer blow. The point may then be readily pressed entirely through the hole in the belt until the head of the bolt abuts against the face of the belt, whereupon the point is unscrewed, leaving the bolt securely attached to the belt and in position for use. Another similar bolt is then threaded into the point and the operation is repeated at the place on the belt where another bolt is to be applied. The operation is continued until all the bolts to be applied are secured in position.

It is found that with this device, operated as described, there is no tearing of the fibers of the belt, the fibers being merely displaced, forming a clean hole for the reception of the bolt.

It will be observed that the point is solid throughout the greater part of its length and that the walls of the socketed part of the point are quite thin, whereby the internal diameter of the screw-threaded portion is not much less than the external diameter thereof and is equal to the diameter of the solid conical portion at a point relatively close to the hollow cylindrical portion. Thus the hole made by the point is but little larger than the hole for the reception of the screw. The hole, however, tends to close up and consequently holds the bolt securely in position so that the bolt does not have, or tend to develop in use, any rocking motion, but maintains a fixed relation with the belt.

It will be noted that the point, unlike a punch, is not withdrawn from the belt in the direction opposed to that in which it is inserted, but, after passing entirely through the belt, is removed by simply unscrewing it from the bolt. It will also be noted that the bolt is applied in the operation of punching the hole. Instead, therefore, of first forcing a punch through the belt, then withdrawing it backward (which tends of itself to tear the fiber of the belt) and then forcing the bolt through in a forward direction (which causes further tearing of the fibers), there is only one insertion in one direction.

The use of my improved point also makes it unnecessary to select a punch of the precise size required to form the bolt holes, which is seldom practicable: it being found in practice that if the punch is too small, the insertion of the bolt is not only rendered difficult but causes the hole to tear irregularly, while if the punch is too large the bolt will be loose in the hole.

It will be understood that the bolts may be applied with little loss of time, the time consumed in screwing and unscrewing the point being more than compensated for by the attachment of the bolt in the perforating operation.

The foregoing description refers to the use of my invention for attaching elevator bucket bolts to elevator belts; but my invention is intended to be used wherever metal plates, such as belt fasteners, are to be attached to belts by means of bolts, or in any case where it becomes necessary to perforate a belt to receive a threaded bolt or screw.

Having now fully described my invention, what I claim and desire to protect by Letters Patent is:

A combined point and bolt for use in connection with belts composed of a bolt having a threaded shank and adapted to extend through a hole in the belt and an enlarged head adapted to engage the face of the belt, and a point whose body throughout the greater part of its length is solid and tapered to a point while the remainder is non-tapered and provided with a screw threaded socket whose internal diameter is uniform and corresponds to the diameter of the solid conical portion of the piece at a part thereof substantially nearer its non-tapered portion than its point, whereby after the bolt is removably connected to the point and both passed through the belt the bolt will remain firmly confined in the hole in the belt.

In testimony of which invention, I have hereunto set my hand, at Scurry, on this 21st day of March, 1914.

JNO. A. GUFFEE.

Witnesses:
JNO. S. OGLESBY,
R. C. LAWSON.